United States Patent [19]

Dahlinger

[11] 4,001,614
[45] Jan. 4, 1977

[54] BIAS CIRCUIT FOR A PHOTO-AVALANCHE DIODE

[75] Inventor: Rodney J. Dahlinger, Canoga Park, Calif.

[73] Assignee: Hughes Aircraft Company, Culver City, Calif.

[22] Filed: Aug. 27, 1975

[21] Appl. No.: 608,113

[52] U.S. Cl. .............................. 307/311; 307/297; 307/254
[51] Int. Cl.$^2$ ........................................ H03K 1/12
[58] Field of Search ........... 307/311, 312, 296–297; 250/552

[56]  References Cited
UNITED STATES PATENTS

| | | | |
|---|---|---|---|
| 3,376,423 | 4/1968 | James | 307/311 X |
| 3,648,073 | 3/1972 | Sams et al. | 307/312 X |
| 3,896,398 | 7/1975 | Ueki | 307/312 |
| 3,898,588 | 8/1975 | Skagerlund | 307/312 |
| 3,925,735 | 12/1975 | Ozeki et al. | 307/312 |

OTHER PUBLICATIONS

I.B.M. Tech. Disc. Bull. Optical Reader by L. S. Rogers et al. vol. 8, No. 10, Mar. 1966, p. 1445.

*Primary Examiner*—Stanley D. Miller, Jr.
*Assistant Examiner*—B. P. Davis
*Attorney, Agent, or Firm*—Donald C. Keaveney; W. H. MacAllister

[57]  ABSTRACT

There is disclosed a bias circuit for a photo-avalanche diode in equipment such as a laser receiver which circuit utilizes the breakdown characteristics of the actual detector diode itself to regulate the applied detector diode bias voltage. This is achieved by providing means to charge a capacitor up to the breakdown voltage in response to a first timing pulse, and second means to offset the capacitor voltage to a lower level by the fixed amount of a positive reference voltage, responsively to a second timing pulse which renders a transistor conductive.

5 Claims, 2 Drawing Figures

BIAS CIRCUIT FOR A PHOTO-AVALANCHE DIODE

BACKGROUND OF THE INVENTION

In laser receivers used for ranging it is necessary to provide an operating bias to a photo-detector which receives the target reflected laser signal as an input and provides an electrical signal as an output to a preamplifier in the receiver system. The prior art has used two basic techniques to provide such bias to a photo-avalanche diode. One technique has used temperature compensation to adjust the bias voltage responsively to prevailing ambient temperature level. A second technique has used noise regulation. Temperature compensation biases the diode as a function of ambient temperatures. The variations between individual diodes result in partial matching and hence degraded performance. Hence it is necessary to adjust the biasing level sufficiently below the avalanche breakdown point to allow for variations in the characteristics of individual diodes used as parts of different receivers.

Noise regulation is utilized in receivers which automatically track the diode noise and compensate for variations in the characteristics of the particular diodes used as a part in a particular receiver. However, the noise at cold temperature is not sufficient to operate this system and artificial optical noise is therefore required. This noise tracking technique is complex and utilizes time division or frequency division multiplex systems of preamplifiers and threshold circuits to achieve the regulation. The system also requires several seconds for stabilization.

SUMMARY OF THE INVENTION

It is an object of the present invention to provide a circuit for utilizing the breakdown characteristic of the actual detector diode used in the individual receiver system to regulate the applied diode bias voltage to thereby overcome the above noted problems of the prior art.

It is a further object of the present invention to utilize a circuit which is simpler than those required in the prior art and yet affords greater individual adjustment precision as well as greater economy of circuit components, stability, and speed of adjustment response over a large temperature range.

It is a more specific object of the invention to provide a detector diode biased by a circuit which can be ready for operation in a few hundred microseconds and thereby eliminate the need for long stabilization times of seconds which is required in such circuitry as the noise tracking regulation technique.

It is an additional object of the invention to provide a single cycle flyback transformer generated bias which is virtually noise free and thereby eliminates the need for power supply filters.

These and other objects and advantages are achieved in a circuit which charges a capacitor up to the breakin down voltage of the photo-avalanche diode itself in response to a first synchronizing pulse and then reduces this bias by a fixed reference voltage amount in response to a second controlling pulse.

BRIEF DESCRIPTION OF THE DRAWINGS

These and other objects and advantages will be more fully apparent from the detailed description below taken in conjunction with the accompanying drawings in which like reference characters refer to like parts throughout and wherein.

DETAILED DESCRIPTION OF THE INVENTION

Figure 2:
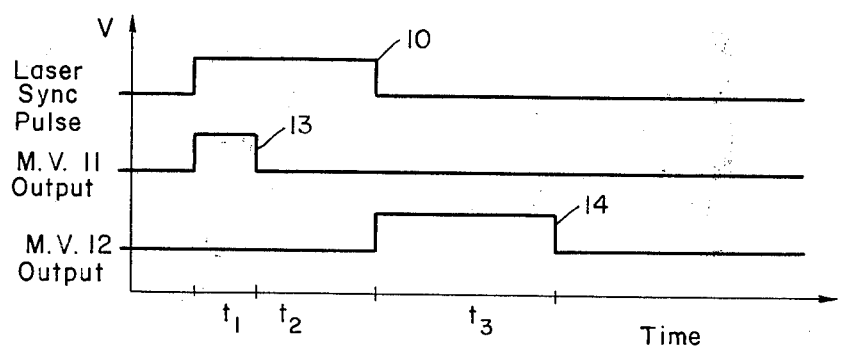
FIG. 2 is a graph diagramatically illustrating the voltage waveforms of the timing pulses at certain points in circuit FIG. 1.

Turning now to the drawing, it will be seen that the laser synchronizing pulse indicated as the voltage waveform 10 in FIG. 2 is applied in parallel to the input of each of a pair of one shot multivibrators 11 and 12. The operating response characteristics of the one shot 11 are such that in response to the application of pulse 10 it provides a pulse output having the waveform shown at 13 in FIG. 2. It will be noticed that the waveform 13 goes positive simultaneously with the leading edge of the pulse 10 and has a shorter duration $t_1$ than does pulse 10. Similarly, the characteristics of the second one shot 12 are such that in response to the waveform 10 at its input it produces an output pulse having the shape shown at waveform 14 in FIG. 2. It is noted that the waveform 14 has its positive going leading edge triggered by the negative going trailing edge of the pulse 10 to appear simultaneously therewith. The pulse 14 remains positive for a period $t_3$ determined by the design of the one shot in a manner well understood in the art.

In the cycle of operation of the circuit, the period $t_1$ defined by pulse 13 is used to draw energy into the primary of flyback transformer T-1. The period $t_2$ between the end of pulse 13 and the beginning of pulse 14 is used to transfer this energy to bias capacitor 22, and the period $t_3$ defined by the duration of pulse 14 is used to depress the voltage across capacitor 22 and diode 19 from $V_{BR}$, the breakdown voltage of diode 19, to ($V_{BR}-V_2$) where $V_2$ is the voltage of battery 24.

Figure 1:
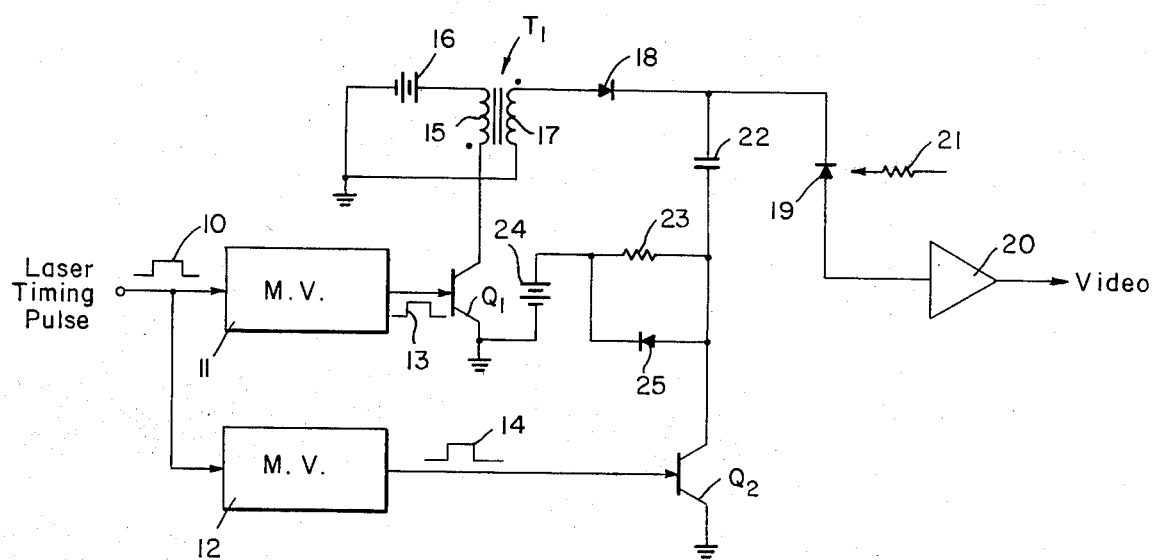
FIG. 1 is a block and circuit diagram of the bias circuit of the present invention.

In FIG. 1, the output 13 of the one shot multivibrator 11 is applied to the base electrode of a first transistor $Q_1$. The output 14 of the second one shot multivibrator 12 is applied to the base electrode of a second transistor $Q_2$.

The emitter of transistor $Q_1$ is connected to ground while its collector is connected to one end of the primary winding 15 of a transformer $T_1$, the other end of which is connected to a positive voltage source 16. The secondary winding 17 of the transformer $T_1$ has one end connected to ground and the other end connected through a diode 18 to the photo-avalanche diode 19 which in turn has its output connected to the preamplifier 20 of the laser receiver system. Light input or laser signal indicated by the arrow 21 is received by diode 19 in the conventional manner. It will be noted that the diodes 18 and 19 are in back to back or opposite polarity relationship.

One plate of the biasing capacitor 22 is connected to the junction point between the diode 18 and the photo-avalanche diode 19. The other plate of the capacitor 22 is connected to the collector of transistor $Q_2$ the emitter of which is connected to ground.

Connected to a junction point between the capacitor 22 and the collector of transistor $Q_2$ is a voltage reference branch circuit consisting of a resistor 23, a voltage source 24, and a clamping diode 25 connected across register 23 and in series with voltage source 24, the other side of which is grounded. This branch provides a reference voltage which functions in a manner to be described below. Voltage source 24 may be either a fixed or adjustable battery or other voltge source.

In operation, when the laser synchronizing pulse 10 triggers the one-shot multivibrator 11, the output pulse 13 of the multivibrator 11 is applied to the base of transistor $Q_1$ and turns on the transistor for the duration $t_1$ of pulse 13. During the on period of the transistor $Q_1$ current flows from voltage source 16 through the primary winding 15 of the flyback transformer $T_1$ and thence through the conductive transistor $Q_1$ to ground. During this conduction energy is stored in the primary winding 15 of transformer $T_1$. Upon termination of the pulse 13 and beginning of period $t_2$, the energy stored in the primary winding 15 starts to transfer to capacitor 22 by means of inductive coupling to secondary winding 17 and thence by conduction through diode 18 to begin the charging cycle of capacitor 22. As the voltage on capacitor 22 increases, the avalanche breakdown level of the photo diode 19 is reached and this diode 19 shunts the remaining current drawn from secondary winding 17. This automatically biases the avalanche diode 19 at its breakdown voltage. However, diode 19 when operated exactly at this breakdown voltage $V_{BR}$ is excessively noisy for laser receiver applications. Therefore it is necessary to reduce its bias voltage below breakdown by a predetermined amount. This reduction is accomplished by the reference voltage branch circuit consisting of resistor 23, voltage source 24, and diode 25 connected as shown in FIG. 1.

The output pulse 14 from the second one-shot multivibrator 12 which commences time period $t_3$ simultaneously with the end of laser synchronizing pulse 10 is applied to the base electrode of transistor $Q_2$ and is utilized to turn on $Q_2$. Capacitor 22 has been charged during time $t_2$ to the exact breakdown voltage $V_{BR\ minus\ voltage\ V2}$ of battery 24. When $Q_2$ turns on the collector of transistor $Q_2$ and the plate of capacitor 22 which is connected to it both go to ground. This reduces the voltage with respect to ground across diode 19 from $V_{BR}$ to $(V_{BR}-V_2)$. Resistor 23 and diode 25 are thus connected to furnish a positive reference for the bottom plate of capacitor 22 thereby setting the diode depression voltage from avalanche. The leakage current of diode 19 is sufficiently low that capacitor 22 does not discharge during time period $t_3$. The avalanche diode output is connected to the preamplifier 20 in the conventional manner as noted above.

It will thus be seen that the circuit utilizes the breakdown characteristics of the actual avalanche detector 19 itself to regulate its own bias voltage which is reduced from the actual breakdown voltage $V_{BR}$ by a predetermined amount $V_2$ determined by the voltage source 24 during operation of the avalanche diode. This technique results in a simple circuit for achieving avalanche diode bias over large temperature ranges which automatically adjust to tolerance or quality control variations and characteristics of the avalanche diodes of different receivers by virtue of the self-regulating feature. The detector diode 19 can be biased and ready for operation in a few hundred microseconds eliminating the need for long stabilization times of the order of magnitudes of seconds which are required by presently used circuits. The single cycle flyback bias is virtually noise free, thus eliminating the need for power supply filters.

In one preferred exemplary embodiment of circuit, major components had the following types and values.

Diode 18, 1N4946; diode 19, C30872 ($V_{BR}$ varies from 250 to 500 volts with temperature change); diode 25, 1N4150; capacitor 22, 0.001 microfarads; transformer $T_1$, Coast Coil 9161; transistor $Q_1$, 2N3019; transistor $Q_2$, 2N2222; resistor 23, 10,000 ohms; battery 24, 15 volts; $t_1$ was 50 microseconds; $t_2$ was 200 microseconds; and $t_3$ was 200 microseconds.

What we claim is:

1. A photo-avalanche diode bias circuit comprising:
   a. a photo-avalanche diode for receiving a light signal and generating an electrical output in response thereto;
   b. capacitor means for providing a bias voltage for said diode, said diode being connected to a first plate of said capacitor means in shunt circuit relationship with said capacitor means;
   c. energy supply circuit means for charging said capacitor means to a voltage level with respect to ground which is equal to the avalanche breakdown voltage of said diode in response to a first timing pulse; and
   d. reference voltage circuit means connected to the second plate of said capacitor means for reducing said diode bias voltage provided by said capacitor by a predetermined amount to a level with respect to ground which is below that of said avalanche breakdown voltage of said diode in response to a second timing pulse.

2. A circuit as in claim 1 wherein said energy supply circuit means comprises a flyback transformer having a first end of its primary winding connected through a voltage source to ground, having a second end of its primary winding connected through the normally nonconductive collector-emitter circuit of a first transistor to ground, having a first end of its secondary winding connected through a diode to the junction point of a first plate of said capacitor means and said photo-avalanche diode and having a second end of its secondary winding connected to ground, said first timing pulse being applied to the base electrode of said first transistor to render said transistor conductive to thereby draw current from said voltage source and store energy in the primary winding of said transformer.

3. A circuit as in claim 1 wherein said reference voltage circuit means comprises a resistor and a clamping diode connected in parallel with each other and both being connected in series with a voltage source to form a series-parallel circuit, said series-parallel circuit being connected between the second plate of said capacitor means and ground; and
   a pulse responsive second transistor also connected between said second plate of said capacitor and ground.

4. A circuit as in claim 2 wherein said reference voltage circuit means comprises a resistor and a clamping diode connected in parallel with each other and both being connected in series with a voltage source to form a series-parallel circuit, said series-parallel circuit being connected between the second plate of said capacitor and ground and said circuit further including a second normally nonconductive transistor having its collector-emitter circuit also connected between said second plate of said capacitor and ground and said second timing pulse being applied to the base electrode of said second transistor to render said second transistor conductive to thereby reduce the voltage with respect to ground on said first plate of said biasing capacitor from a value equal to the breakdown voltage of said photo-avalanche diode to which said capacitor is originally charged by said transformer after said first timing pulse to a value equal to said breakdown voltage minus the voltage of said reference voltage source.

5. A circuit as in claim 4 wherein said first timing pulse is derived from a first one shot multivibrator and said second timing pulse is derived from a second one shot multivibrator, both of said multivibrators being triggered by a laser synchronizing pulse, the leading edge of said synchronizing pulse triggering said first multivibrator which has a pulse period shorter than that of said synchronizing pulse and the second multivibrator being triggered by the trailing edge of said synchronizing pulse.

* * * * *